(12) United States Patent
Mrowiec et al.

(10) Patent No.: US 11,475,746 B2
(45) Date of Patent: Oct. 18, 2022

(54) METHOD AND APPARATUS FOR CAMERA ACTIVATION

(71) Applicant: MOTOROLA SOLUTIONS, INC, Chicago, IL (US)

(72) Inventors: Robert Mrowiec, Liszki (PL); Rafal Jan Kaminski, Cracow (PL); Andrzej Lichnerowicz, Gdynia (PL); Mariusz R. Wawrowski, Wawrzenczyce (PL)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 449 days.

(21) Appl. No.: 15/776,974

(22) PCT Filed: Mar. 15, 2016

(86) PCT No.: PCT/PL2016/050005
§ 371 (c)(1),
(2) Date: May 17, 2018

(87) PCT Pub. No.: WO2017/160170
PCT Pub. Date: Sep. 21, 2017

(65) Prior Publication Data
US 2018/0376111 A1   Dec. 27, 2018

(51) Int. Cl.
*H04N 7/18*       (2006.01)
*G08B 13/196*    (2006.01)
(Continued)

(52) U.S. Cl.
CPC ........ *G08B 13/19695* (2013.01); *G10L 25/51* (2013.01); *G10L 25/72* (2013.01);
(Continued)

(58) Field of Classification Search
USPC ......................................................... 348/159
See application file for complete search history.

(56) References Cited

U.S. PATENT DOCUMENTS 6,909,457 B1   6/2005  Fukasawa
6,965,541 B2 *  11/2005  Lapin ................... G01S 3/8003
                                                              367/118

(Continued)

FOREIGN PATENT DOCUMENTS

| EP | 2983357 A2 | 2/2016 |
|----|------------|--------|
| WO | 2009053702 A1 | 4/2009 |
| WO | 2016014855 A1 | 1/2016 |

OTHER PUBLICATIONS

Anonymous: "Me 1-frequency cepstrum", Sep. 1, 2015 (Sep. 1, 2015), XP055316024, Retrieved from the Internet: URL:https://en.wikipedia.org/w/index.php?title=Mel-frequency cepstrum&oldid= 678961807 [retrieved on Nov. 2, 2016].

(Continued)

*Primary Examiner* — Nigar Chowdhury (57) ABSTRACT

During operation a first personal-area network will activate a first camera. The first camera may be manually activated, or triggered by an audio signal. The event that causes the first camera to activate will also cause the personal-area network to send an acoustic signature to other personal-area networks. Personal-area networks that receive the acoustic signature will modify audio triggers so that the acoustic signature can be better distinguished from other noises.

6 Claims, 5 Drawing Sheets

(51) Int. Cl.
*H04N 21/2543* (2011.01)
*H04N 21/258* (2011.01)
*G10L 25/51* (2013.01)
*G10L 25/72* (2013.01)
*G10L 25/24* (2013.01)

(52) U.S. Cl.
CPC ............. *H04N 7/181* (2013.01); *H04N 7/188* (2013.01); *H04N 21/25435* (2013.01); *H04N 21/25808* (2013.01); *G10L 25/24* (2013.01)

(56) References Cited

U.S. PATENT DOCUMENTS

| | | | | |
|---|---|---|---|---|
| 7,376,565 | B2* | 5/2008 | Gandhi | G08B 1/08 704/274 |
| 8,063,773 | B2 | 11/2011 | Fisher et al. | |
| 8,805,431 | B2 | 8/2014 | Vasavada et al. | |
| 8,990,077 | B2 | 3/2015 | Mallett et al. | |
| 9,451,178 | B2* | 9/2016 | Kelder | H04N 5/2621 |
| 9,571,723 | B2* | 2/2017 | Velipasalar | H04N 7/18 |
| 10,231,006 | B2* | 3/2019 | Layson, Jr | H04N 21/6131 |
| 10,282,949 | B2* | 5/2019 | Penland | G08B 15/00 |
| 2003/0128130 | A1* | 7/2003 | Kao | G08B 13/19634 340/541 |
| 2003/0227540 | A1* | 12/2003 | Monroe | G08B 13/19645 348/E7.086 |
| 2004/0036596 | A1* | 2/2004 | Heffner | G08B 13/19658 379/39 |
| 2004/0075547 | A1* | 4/2004 | Vojtech | G08B 13/19634 340/500 |
| 2005/0088915 | A1* | 4/2005 | Lapin | G01S 3/8003 367/118 |
| 2006/0098088 | A1* | 5/2006 | Raghunath | H04N 5/782 348/61 |
| 2008/0030580 | A1* | 2/2008 | Kashiwa | G08B 13/19621 348/158 |
| 2008/0288986 | A1* | 11/2008 | Foster | G08B 13/19656 725/62 |
| 2010/0142715 | A1* | 6/2010 | Goldstein | G06F 16/686 381/56 |
| 2010/0142725 | A1* | 6/2010 | Goldstein | H04R 29/00 381/92 |
| 2011/0289532 | A1 | 11/2011 | Yu et al. | |
| 2012/0127308 | A1* | 5/2012 | Eldershaw | G08B 13/1672 348/143 |
| 2014/0184796 | A1 | 7/2014 | Klein et al. | |
| 2014/0199041 | A1* | 7/2014 | Blanco | G08B 13/19621 386/224 |
| 2015/0012463 | A1 | 1/2015 | Rosenthal | |
| 2015/0194045 | A1* | 7/2015 | Edwards | G08B 13/1672 340/540 |
| 2015/0373236 | A1* | 12/2015 | Thorn | H04N 5/23216 348/158 |
| 2016/0042767 | A1* | 2/2016 | Araya | G11B 19/02 386/201 |
| 2016/0119667 | A1* | 4/2016 | Layson, Jr | H04N 21/6131 386/226 |

OTHER PUBLICATIONS

The International Search and the Written Opinion corresponding serial No. PCT/PL2016/050005 filed Mar. 15, 2016, dated Nov. 6, 2016, all pages.

* cited by examiner

METHOD AND APPARATUS FOR CAMERA ACTIVATION

FIELD OF THE INVENTION

The present invention generally relates to camera activation, and more particularly to a method and apparatus for camera activation based on collaborative microphones.

BACKGROUND OF THE INVENTION

Continuous recording on wearable cameras used by public safety officers introduces challenges. One challenge facing the cameras is battery life. For example, there may not be enough battery life for an officer to keep a wearable camera in operation on a permanent basis. Another challenge is the amount of data acquired by a continuously-operating camera. Analyzing and storing terabytes of video footage consumes lots of time and resources (human and/or computing). Therefore, manual activation of wearable cameras is preferred; however, manual activation of camera is not always possible in the moments that matter, because saving the life of citizen and/or officer is more important than turning on the camera. Therefore a need exists for a method and apparatus for automatically activating a camera when needed.

BRIEF DESCRIPTION OF THE SEVERAL VIEWS OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required.

DETAILED DESCRIPTION

In order to address the above, mentioned need, a method and apparatus for activating a camera is provided herein. During operation a first personal-area network will activate a first camera. The first camera may be triggered by a manual activation, or triggered by an audio signal. The trigger that causes the first camera to activate will also cause the personal-area network to send an acoustic signature to other personal-area networks. Personal-area networks that receive the acoustic signature will modify audio triggers (i.e., audio signatures that trigger activation of a camera).

As discussed above, personal-area networks that receive the acoustic signature will modify audio triggers so that the acoustic signature can be better distinguished from other noises, and used to trigger activation of a camera. More particularly, a particular device will match captured audio sample against acoustic signatures (S1, S2, . . . , Sn) which are stored in the device, and if a match exists beyond some threshold (or if deviation is within some tolerance), a camera is activated. If device B sends acoustic signature Sx to device A, device A will check if its stored acoustic signatures set already include Sx; if not, device A stores Sx and uses it for camera activation. If Sx is already stored at device A, device A it modifies a threshold (or deviation tolerance) of Sx for some period of time, so that it is more "sensitive" to sounds similar to Sx.

As an example of the above, police radios (mobile radios) may have a list of acoustic signatures which should activate a local camera. A local network will use microphones to continuously listen to ambient sounds. Once the ambient sound matches one of the acoustic signatures, the radio transmits the particular acoustic signature to other radios. The other radios may comprise radios within a same talkgroup or radios within a predetermined distance from the source of the audio. Radios which receive the acoustic signature, modify audio triggers so that this acoustic signature can be better distinguished from other noises. As discussed above, the audio triggers may be modified by simply adding the acoustic signatures to a database of triggers, or by lowering a threshold for camera activation if the acoustic signature is already stored in the database of triggers.

Another example of the above may comprise a situation where mobile radios use their microphones to continuously listen to ambient sounds, and are keeping a rolling buffer of last few seconds of audio. Once a camera is manually activated by the user, the radio extracts the acoustic signatures from last few seconds of recorded audio. The acoustic signatures are then transmitted to other radios so that radios which receive the acoustic signatures can modify audio triggers so that these acoustic signatures can be better distinguished from other noises.

Radios that receive the acoustic signature may again forward the acoustic signature to other radios if a match is made with the received acoustic signature within certain time since receiving this acoustic signature. This allows for tracking an audio source that may be moving.

Figure 1:
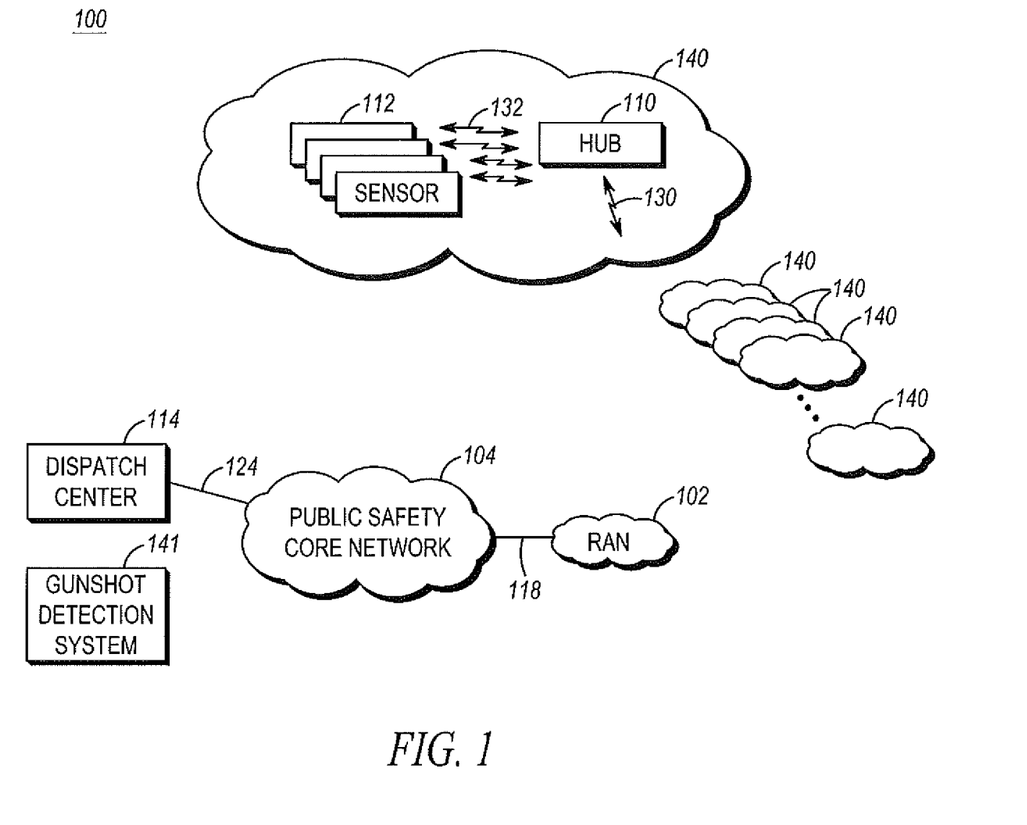
FIG. 1 depicts a general operating environment for a camera and microphone.

Turning now to the drawings wherein like numerals designate like components, FIG. 1 depicts a general operating environment 100 for a camera and microphone that includes one or more radio access networks (RANs) 102, a public-safety core network 104, hub 110, local sensors 112, a dispatch center 114, city-wide (wide area) gunshot detection system 141, and communication links 118, 124. In a preferred embodiment of the present invention, hub 110 and sensors 112 form a body-area network, local area network, or personal-area network 140, with communication links 132 between sensors 112 and hub 110 taking place utilizing a short-range communication system protocol such as a Bluetooth communication system protocol. Networks 140 are typically worn by public safety officers, and will be further described in FIG. 2.

Each RAN 102 includes typical RAN elements such as base stations, base station controllers (BSCs), routers, switches, and the like, arranged, connected, and programmed to provide wireless service to user equipment (e.g., hub 110, and the like) in a manner known to those of skill in the relevant art.

The public-safety core network 104 may include one or more packet-switched networks and/or one or more circuit-switched networks, and in general provides one or more public-safety agencies with any necessary computing and communication needs, transmitting any necessary public-safety-related data and communications.

The hub 110 may be any suitable computing and communication devices configured to engage in wireless communication with the RANs 102 over the air interface as is known to those in the relevant art. Moreover, one or more hub 110 are further configured to engage in wired and/or wireless communication with one or more local sensor 112 via the communication link 132. Hub 110 will be configured to determine when to forward acoustic signatures (e.g., via peer-to-peer communications to other hubs 110, or via RANs 102) based on a sensor 112 inputs. It should be noted that while FIG. 1 shows sensors 112 existing external to hub 110 one of ordinary skill in the art will recognize that hub 110 may include any number of sensors 112 existing internal to hub 110.

Sensors 112 may comprise any device capable of generating a current context. For example, sensors 112 preferably comprise at least one gunshot detector, at least one gun drawn detector, and at least one GPS receiver capable of determining a location of the user device, a camera, a microphone, . . . etc. Other sensors may include a clock, calendar, environmental sensors (e.g. a thermometer capable of determining an ambient temperature, humidity, presence of dispersed chemicals, radiation detector, etc.), an accelerometer, a barometer, speech recognition circuitry, a user's electronic calendar, short-range communication circuitry (e.g., Bluetooth™ circuitry) to determine what other electronic devices are near . . . , etc.

Finally, dispatch center 114 is preferably manned by an operator providing necessary dispatch operations. Dispatch center 114 comprises a graphical user interface that provides the dispatch operator necessary information about public-safety officers. As discussed above, this information may originate from sensors 112 providing information to hub 110, which forwards the information to RAN 102 and ultimately to dispatch center 114. Additionally, this information may originate from other sources, for example, a wide-area gunshot detection system providing the information to RAN 102 and ultimately to dispatch center 114.

During operation, hub 110 will detect the need to activate a camera 112. The camera may be manually activated, or triggered by an audio signal received by a microphone 112, or triggered by any one of sensors 112 being activated (e.g., a gun-drawn sensor being activated). Microphone 112 may exist internal, or external to hub 110. The event that causes the first camera to activate will also cause the personal-area network to send an acoustic signature to other personal-area networks 140. Personal-area networks 140 that receive the acoustic signature will modify audio triggers so that the acoustic signature can be better distinguished from other noises. As discussed above, the acoustic signature may be added to a database of triggers, or triggering thresholds may be lowered if the acoustic signature already exists in the database.

When matching captured ambient sound, the acoustic sound may be compared against stored triggers. This comparison will determine if the ambient noise matches any stored acoustic signature. The matching takes place by comparing mel-cepstral coefficients or other measureable audio features. A threshold exists for whether or not a match is made. In the preferred embodiment of the present invention the threshold comprises a maximum deviation of mel-cepstral coefficients or other measureable audio features. Adjustment of this threshold takes place by modifying the aforementioned maximum deviation.

Figure 2:
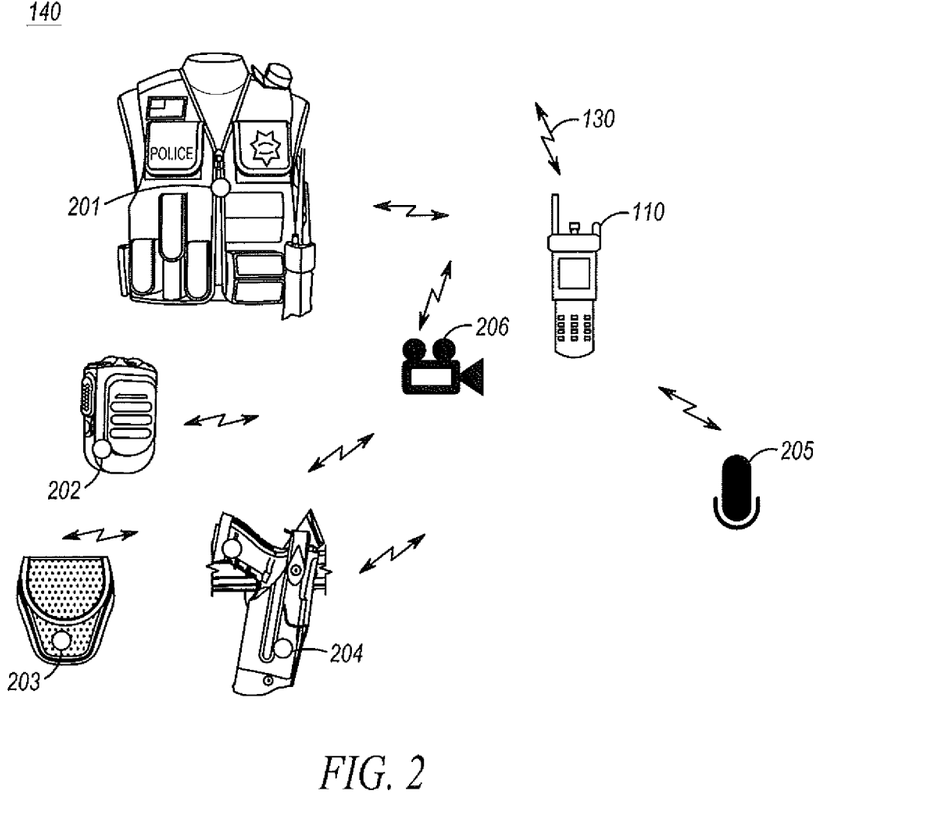
FIG. 2 depicts a more-detailed view of the body-area network of FIG. 1.

FIG. 2 depicts a more-detailed view of the personal-area network 140 of FIG. 1. Personal-area network comprises a local-area network that has a range of, for example 10 feet. As shown in FIG. 2, various sensors 112 are shown attached to equipment utilized by a public-safety officer. In this particular example, a bio-sensor 201 is located within a police vest, a sound/voice detector 202 is located within a police microphone, a handcuff deployment sensor 203 is located with a handcuff pouch, a gun-draw sensor 204 is located within a holster. Camera 206 is provided to capture video of events. Microphone 205 is provided to listen to ambient noise and provide the noise to hub 110. Hub 110 stores the acoustic signature of sounds received from microphone 205 and determines if any sounds (e.g., gunshots) within the area have been heard that require automatic activation of camera 206. It should be noted, that one of ordinary skill in the art may recognize that other sensors 112 (e.g., handcuff sensor 203, or gun drawn sensor 204) may trigger camera 206 to activate. This will cause hub 110 to forward an acoustic signature of the environment. Additionally, camera 206 may be manually activated, causing hub 110 to forward an acoustic signature of the environment.

The acoustic signature that is forwarded comprises mel-cepstral coefficients and/or other measureable audio features, like spectral flatness, etc. The acoustic signature may also comprise any type of audio file, for example, an audio file such as, but not limited to an MPEG 3 file.

As discussed above, sensors and hub 110 form a personal/local-area network (LAN) 140. LAN 140 preferably comprises a Bluetooth piconet. Sensors and hub 110 are considered Bluetooth devices in that they operate using a Bluetooth, a short range wireless communications technology at the 2.4 GHz band, commercially available from the "Bluetooth special interest group". Sensors and hub 110 are connected via Bluetooth technology in an ad hoc fashion forming a piconet. Hub 110 serves as a master device while sensors serve as slave devices. Sensors notify hub 110 of a sensed condition by sending a local status alert transmitted from the sensor as a Bluetooth message. Hub 110 in turn, may forward the local status alert and any acoustic signatures over a wider-area network (e.g., RAN/Core Network) to dispatch center 114. In alternate embodiments of the present invention, hub 110 may forward the local status alert to mobile and non-mobile peers (shift supervisor, peers in the field, etc), or to the public via social media. Such a system is fully described in U.S. patent application Ser. No. 14/747,567, entitled, METHOD AND APPARATUS FOR FORWARDING LOCAL-ALERT MESSAGES WITHIN A COMMUNICATION SYSTEM.

Figure 3:
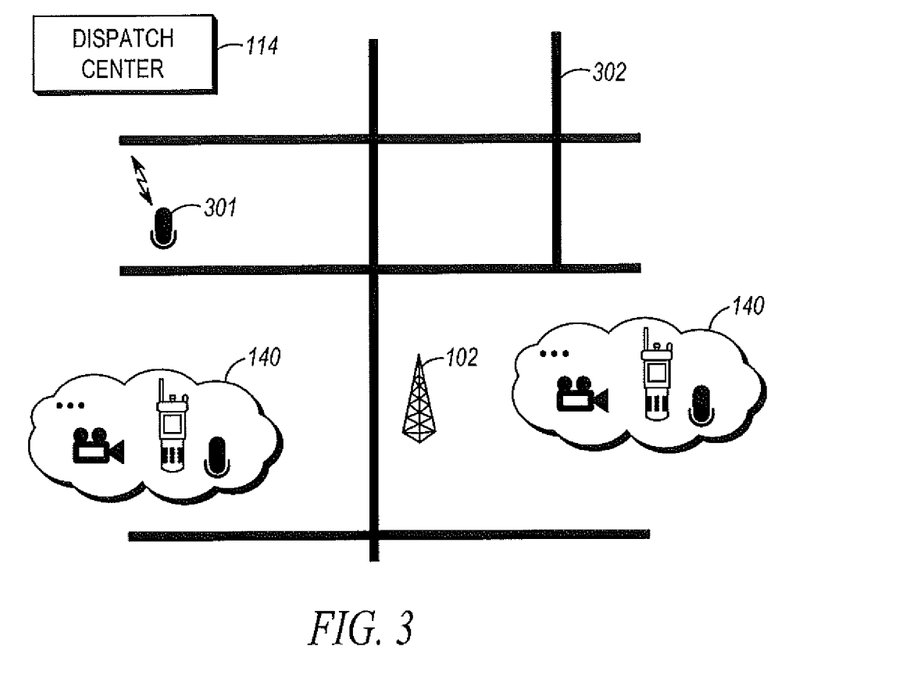
FIG. 3 illustrates a wide-area deployment of body-area networks.

FIG. 3 illustrates a wide-area deployment of body-area networks. In this particular scenario, wide-area gunshot detection system 301 is integrated into the system shown in FIG. 2. Gunshot detection system 301 preferably comprises stationary sensors located on, for example, light poles, or near roads 302 within an area. The sensors are specially designed to detect the report of a gun being fired and a time of any detected gunshot. This information can be provided to dispatch center 114 so that location information may be obtained for any gunshot detected. Such a system, for example, comprises Shotspotter® manufactured by SSI, Inc. Such a system uses multiple collaborative acoustic sensors that activate when gunfire occurs, providing comprehensive outdoor coverage over complex urban geographies. When there is a shooting, sensors report this information and software triangulates and pinpoints the precise location of each round fired. An acoustic signature of the gunshot may be provided to dispatch center 114 and ultimately to personal-area networks 140.

As discussed, police radios (acting as hubs 110) may have a list of acoustic signatures which should activate a camera. Mobile radios use microphones to continuously listen to ambient sounds. The microphones may be external or internal to the police radio. Once the hub determines that the ambient sound matches one of the acoustic signatures, the radio transmits the particular acoustic signature to other radios. As discussed above, the acoustic signature comprises mel-cepstral coefficients and/or other measureable audio features, like spectral flatness, etc.

The other radios may comprise radios within a same talkgroup or radios within a predetermined distance from the source of the audio. Radios which receive the acoustic signature, modify its audio triggers so that this acoustic signature can be better distinguished from other noises.

Expanding on the above, transmissions from a hub to other hubs (radios) may take place by radio 110 (acting as a hub) transmitting information (e.g., an acoustic signature) to RAN 102, which forwards the information to other radios 110 (as well as dispatch center 114). Alternatively, transmissions from a hub to other hubs (radios) may take place via a direct communication link with the other hubs 110, via peer-to-peer communications.

Another example of the above may comprise a situation where mobile radios (hubs 110) use microphones to continuously listen to ambient sounds, and keep a rolling buffer of last few seconds of audio. Once a camera is manually activated by the user, the camera notifies a hub 110, which radio broadcasts the acoustic signatures extracted from last few seconds of recorded audio. The recorded audio is then transmitted to other radios so that radios which receive the acoustic signatures can modify their audio triggers so that these acoustic signatures can be better distinguished from other noises.

Figure 4:
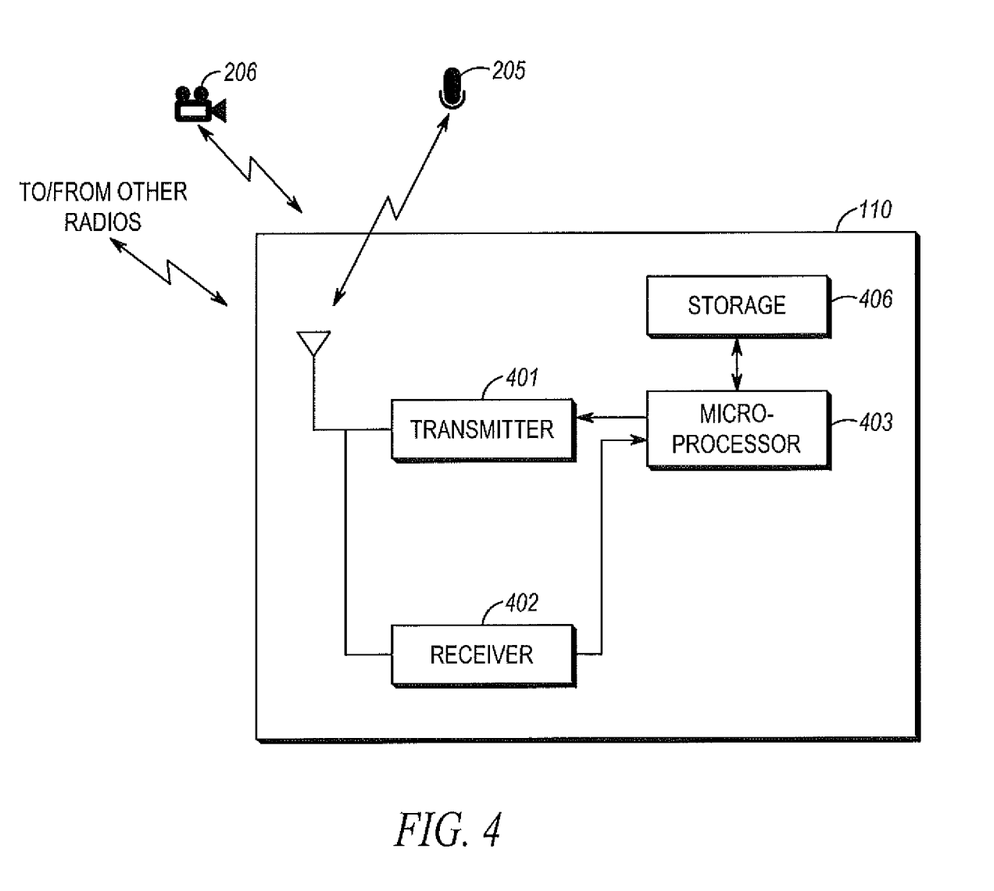
FIG. 4 is a block diagram of a hub in a body-area network.

FIG. 4 is a block diagram of hub 110 in body-area network 140. Hub 110 preferably comprises a police radio. As shown, hub 110 may include over-the-air transmitter 401, over-the-air receiver 402 (which may be wired or wireless), storage 406, and logic circuitry 403. In other implementations, hub 110 may include more, fewer, or different components.

Transmitter 401 and receiver 402 may be well known long-range and/or short range transceivers that utilize any number of network system protocols. For example, transmitter 401 and receiver 402 may be configured to a private 802.11 network, a next-generation cellular communications protocol operated by a cellular service provider, any public-safety protocol such as an APCO 25 network or the FirstNet broadband network, and/or any short-range communication system such as those employing the Bluetooth communication system protocol. Although only a single transmitter and receiver are shown in FIG. 4, one of ordinary skill in the art will recognize that multiple transmitters and receivers may exist in hub 110 to provide simultaneous communications using any number of communication system protocols.

Logic circuitry 403 comprises a digital signal processor (DSP), general purpose microprocessor, a programmable logic device, or application specific integrated circuit (ASIC) and is configured to determine when to transmit acoustic signatures to other hubs. When receiving acoustic signatures from other hubs 110, logic circuitry 403 uses the received signature to determine when to activate camera 206. Acoustic signatures are preferably stored in storage 406, which comprises standard random-access storage.

The system of FIG. 4 provides for an apparatus comprising a sensor detecting, a triggering event. In FIG. 4, only microphone 205 is shown as a sensor. Camera 206 is provided, and logic circuitry is provided for activating the camera based on the detection of the triggering event. As discussed above, microphone 205 records ambient audio after the detected triggering event, and transmitter 401 forwards an acoustic signature of the ambient audio, wherein the acoustic signature is utilized by a radio to activate a second camera.

As discussed above, the acoustic signature may comprise mel-cepstral coefficients and/or other measureable audio features, like spectral flatness, etc. Also, the acoustic signature is utilized by the radio to modify or add to existing acoustic signatures used to activate the second camera.

As discussed, the sensor may comprise such sensors as, but not limited to a gunshot detector and a gun drawn detector. The triggering events may comprise a gunshot, or a gun-drawn detection/event.

Figure 5:
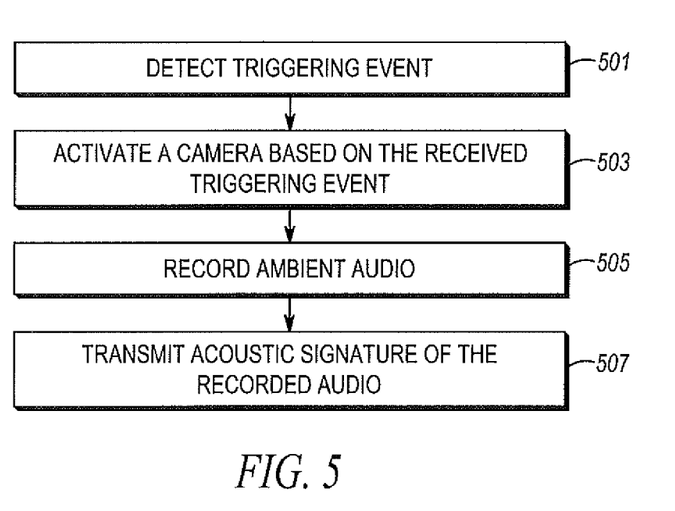
FIG. 5 is a flow chart showing operation of the hub of FIG. 4.

FIG. 5 is a flow chart showing operation of the hub of FIG. 4. The logic flow begins at step 501 where a sensor detects a triggering event. At step 503 the triggering event is provided to logic circuitry 403 and logic circuitry 403 activates a camera based on the detection of the triggering event. Logic circuitry 403 also instructs microphone 205 to recording ambient audio (step 505). Finally, at step 507 logic circuitry instructs transmitter 401 to transmit an acoustic signature of the ambient audio, wherein the acoustic signature is utilized by another radio to activate a second camera.

Figure 6:
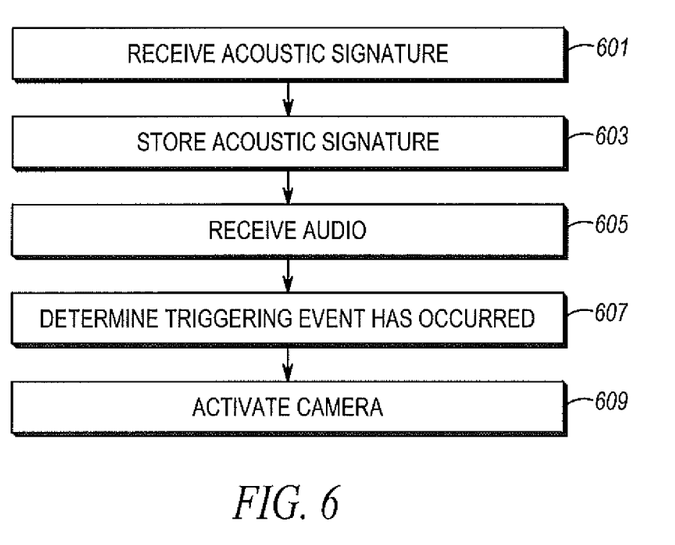
FIG. 6 is a flow chart showing operation of the hub of FIG. 4.

FIG. 6 is a flow chart showing operation of the hub of FIG. 4 when receiving acoustic signatures from other radios. The logic flow begins at step 601 where receiver 402 receives an acoustic signature. The acoustic signature is provided to logic circuitry 403 and stored in storage 406 (step 603). Audio from microphone 205 is received (step 605) and logic circuitry determines that a triggering event has occurred by comparing received audio to the acoustic signature (step 607). Finally, logic circuitry 403 activates camera 206 based on the triggering event occurring.

In the foregoing specification, specific embodiments have been described. However, one of ordinary skill in the art appreciates that various modifications and changes can be made without departing from the scope of the invention as set forth in the claims below. For example, to prevent losing an initial part of video recording while the camera is off and the system performs a voice matching algorithm, the camera could be temporarily activated upon receipt of any acoustic signal, and could buffer the video recording until it is determined whether to activate recording. If recording should be activated, the buffered video is prepended to the further recording. If the recording should not be activated, the buffered video is deleted. Accordingly, the specification and figures are to be regarded in an illustrative rather than a restrictive sense, and all such modifications are intended to be included within the scope of present teachings.

Those skilled in the art will further recognize that references to specific implementation embodiments such as "circuitry" may equally be accomplished via either on general purpose computing apparatus (e.g., CPU) or specialized processing apparatus (e.g., DSP) executing software instructions stored in non-transitory computer-readable memory. It will also be understood that the terms and expressions used herein have the ordinary technical meaning as is accorded to such terms and expressions by persons skilled in the technical field as set forth above except where different specific meanings have otherwise been set forth herein.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising the steps of:
   detecting, at a first sensor, a triggering event, wherein the first sensor is part of a first personal-area network (PAN);
   activating a first camera based on the detection of the triggering event, wherein the first camera is part of the first PAN;
   recording audio by the first camera based on the detection of the triggering event;
   extracting an acoustic signature from the recorded audio by the first camera; and
   forwarding, via a first radio, the acoustic signature of the audio recorded based on the detection of the triggering event to a second radio, wherein the acoustic signature is utilized by the second radio as a trigger used to activate a second camera upon the detection of the acoustic signature, wherein the second radio and the second camera are part of the second PAN.

2. The method of claim 1 wherein the acoustic signature comprises mel-cepstral coefficients, spectral flatness and/or other measureable audio features.

3. The method of claim 1 wherein the sensor comprises a gunshot detector and the triggering event is a detection of a gunshot.

4. The method of claim 1 wherein the sensor comprises a gun-draw sensor, and the triggering event is a gun-drawn event.

5. The method of claim 1 further comprising the steps of:
   receiving, at the second radio, the acoustic signature;
   storing the acoustic signature;
   receiving audio from a microphone that is part of the second PAN;
   determining that a triggering event has occurred by comparing received audio to the acoustic signature; and activating the second camera based on the triggering event occurring.

6. The method of claim 5 further comprising the step of:
modifying an existing acoustic signature based on the received acoustic signature.

\* \* \* \* \*